US010212330B2

(12) United States Patent
Van Hoeckel et al.

(10) Patent No.: US 10,212,330 B2
(45) Date of Patent: Feb. 19, 2019

(54) AUTOFOCUSING A MACRO OBJECT BY AN IMAGING DEVICE

(71) Applicant: BlackBerry Limited, Waterloo (CA)

(72) Inventors: Martin Frank Clayton Van Hoeckel, Waterloo (CA); Matthew Everitt Wakelin, Waterloo (CA); Mu-I Helton Chen, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/927,762

(22) Filed: Oct. 30, 2015

(65) Prior Publication Data

US 2017/0118394 A1    Apr. 27, 2017

Related U.S. Application Data

(60) Provisional application No. 62/247,158, filed on Oct. 27, 2015.

(51) Int. Cl.
*H04N 5/232* (2006.01)
*G02B 7/38* (2006.01)
*H04N 5/14* (2006.01)
*G02B 7/34* (2006.01)

(52) U.S. Cl.
CPC ......... *H04N 5/23212* (2013.01); *G02B 7/346* (2013.01); *G02B 7/38* (2013.01); *H04N 5/147* (2013.01)

(58) Field of Classification Search
CPC . H04N 5/23212; H04N 5/23216; G03B 13/36
See application file for complete search history.

(56) References Cited

U.S. PATENT DOCUMENTS

| 6,812,969 | B2 * | 11/2004 | Ide | G02B 7/28 348/333.04 |
|---|---|---|---|---|
| 7,248,301 | B2 | 7/2007 | Voss et al. | |
| 2006/0238622 | A1 | 10/2006 | Shimosto | |
| 2008/0278619 | A1 | 11/2008 | Otsu | |

(Continued)

FOREIGN PATENT DOCUMENTS

| JP | 20090047942 | 3/2009 |
|---|---|---|
| JP | 2013020123 | 1/2013 |

OTHER PUBLICATIONS

EPO, European Extended Search Report relating to EP application No. 16188904.3, dated Mar. 24, 2017.

*Primary Examiner* — Twyler L Haskins
*Assistant Examiner* — Carramah J Quiett
(74) *Attorney, Agent, or Firm* — Rowand LLP

(57) ABSTRACT

A method and device for autofocusing a macro object by an imaging device is provided. The imaging device includes a lens. In one aspect, the method includes: providing two or more focus perimeters in a viewfinder; obtaining a group of focus values, the group of focus values including at least one focus value associated with each of the two or more focus perimeters, each focus value in the group of focus values including a magnitude and a direction for causing movement of the lens; comparing focus values in the group of focus values to identify a macro object focus value; and in response to identifying the macro object focus value, determining autofocus settings based on the macro object focus value.

20 Claims, 9 Drawing Sheets

(56) References Cited

U.S. PATENT DOCUMENTS

| | | |
|---|---|---|
| 2009/0244354 A1 | 10/2009 | Sakaguchi et al. |
| 2009/0262233 A1 | 10/2009 | Nagahata et al. |
| 2014/0362275 A1 | 12/2014 | Brunner et al. |
| 2015/0092101 A1* | 4/2015 | Yamazaki .......... H04N 5/23212 348/353 |
| 2015/0242982 A1 | 8/2015 | Choi et al. |
| 2016/0065834 A1* | 3/2016 | Chang ................ H04N 5/23212 348/347 |

\* cited by examiner

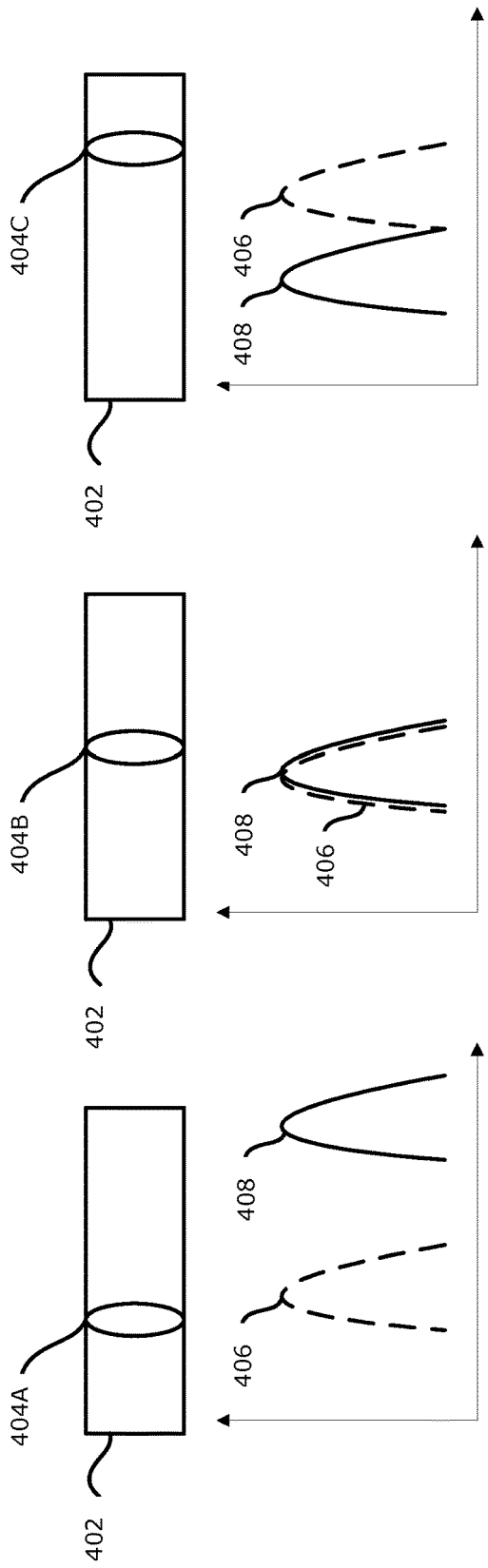

AUTOFOCUSING A MACRO OBJECT BY AN IMAGING DEVICE

The present disclosure relates generally to electronic devices having cameras and, more particularly, to methods and devices for autofocusing macro objects by an imaging device.

BACKGROUND

Electronic devices having cameras, such as an imaging devices, are often equipped with an image sensor, at least one camera lens and a viewfinder. The lens may be moved towards or away from the image sensor to focus an object or scene onto the camera image sensor. Electronic devices having cameras often utilize autofocus mechanisms for determining movement of the lens relative to the camera image sensor. Some electronic devices having cameras use phase detection autofocus for determining movement of the lens relative to the image sensor.

The viewfinder of the imaging device may have one or more defined regions of interest. The imaging device may use information obtained from the regions of interest to determine a camera lens position relative to the camera image sensor. When the scene being photographed includes small objects in the foreground, the distance between a foreground object and the camera lens (or the camera image sensor) may be less than the distance between the background scene (i.e. requiring a lens in an infinity position) and the camera lens (or the camera image sensor). Accordingly, the imaging device may average the distances and determine lens movement based on the averaged distance. The resulting lens position may not be an optimal lens position for focusing either the foreground object or the background scene onto the camera image sensor.

BRIEF DESCRIPTION OF THE DRAWINGS

Reference will now be made, by way of example, to the accompanying drawings which show example embodiments of the present application, and in which:

FIGS. 4A, 4B and 4C illustrate signals of image portions captured on phase detection autofocus focus sensors relative to camera lens positions in accordance with example embodiments of the present disclosure;

Like reference numerals are used in the drawings to denote like elements and features.

DETAILED DESCRIPTION OF EXAMPLE EMBODIMENTS

Figure 2:
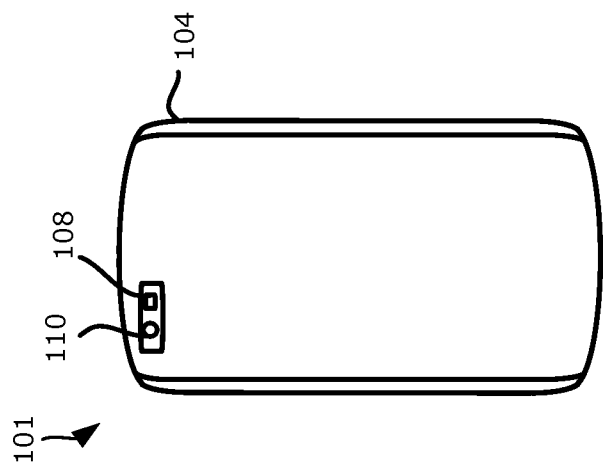
FIG. 2 is a rear view of the example electronic device of FIG. 1 in accordance with example embodiments of the present disclosure.

In one example aspect, the present disclosure describes a method for autofocusing a macro object by an imaging device. The imaging device may have a lens. The method includes: providing two or more focus perimeters in a viewfinder; obtaining a group of focus values, the group of focus values including at least one focus value associated with each of the two or more focus perimeters, each focus value in the group of focus values including a magnitude and a direction for causing movement of the lens; comparing focus values in the group of focus values to identify a macro object focus value; and in response to identifying the macro object focus value, determining autofocus settings based on the macro object focus value.

In another aspect, an electronic device is described. The electronic device includes a lens and an image sensor. The electronic device also includes a processor coupled to the image sensor and the lens. The processor is configured to: provide two or more focus perimeters in a viewfinder; obtain a group of focus values, the group of focus values including at least one focus value associated with each of the two or more focus perimeters, each focus value in the group of focus values including a magnitude and a direction for causing movement of the lens; compare focus values in the group of focus values to identify a macro object focus value; and in response to identifying the macro object focus value, determine autofocus settings based on the macro object focus value.

In yet a further aspect, a non-transitory computer-readable storage medium comprising processor-executable instructions is described. The instructions, when executed by a processor of the electronic device, causes the electronic device to: provide two or more focus perimeters in a viewfinder; obtain a group of focus values, the group of focus values including at least one focus value associated with each of the two or more focus perimeters, each focus value in the group of focus values including a magnitude and a direction for causing movement of the lens; compare focus values in the group of focus values to identify a macro object focus value; and in response to identifying the macro object focus value, determining autofocus settings based on the macro object focus value.

In yet a further aspect, the present disclosure describes non-transitory computer-readable media storing computer-executable program instructions which, when executed, configure a processor to perform the described methods.

Other aspects and features of the present application will be understood by those of ordinary skill in the art from a review of the following description of examples in conjunction with the accompanying figures.

In the present application, the term "and/or" is intended to cover all possible combination and sub-combinations of the listed elements, including any one of the listed elements alone, any sub-combination or all of the elements, and without necessarily excluding additional elements.

In the present application, the term "a processor" is intended to include both a single processor and also a plurality of processors coupled to one another which distribute operations among the processors.

Figure 1:
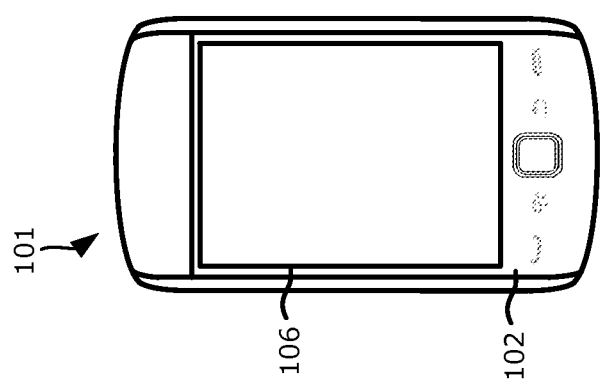
FIG. 1 is a front view of an example electronic device in accordance with example embodiments of the present disclosure.

Reference will now be made to FIGS. 1 and 2, which illustrate an example electronic device having a camera. The electronic device 101 that is equipped with the camera may take a variety of forms and may be referred to as an imaging device. In the illustrated example, the electronic device 101 is a smartphone. In other embodiments, the electronic device 101 may be a tablet computer, a stand-alone camera (i.e., a digital camera), a personal digital assistant (PDA), a wearable computer such as a watch or an electronic device of another type.

FIG. 1 illustrates a front side 102 of the electronic device 101. FIG. 2 illustrates a rear side 104 of the electronic device 101. The example electronic device 101 includes a housing which houses at least some of the components of the electronic device 101. At least some of these components will be described below with reference to FIG. 3.

In the example embodiment illustrated, the electronic device 101 includes a display 106, which may be a touchscreen display which acts as both an input interface and an output interface. The display 106 is disposed within the electronic device 101 so that it is viewable on the front side 102 of the electronic device 101.

In an operating mode, the display 106 acts as a viewfinder for a camera, displaying, in real time or near real time, images defined in electronic signals received from a camera. The viewfinder allows a user to preview an image.

Referring now to FIG. 2, a rear side 104 of the electronic device 101 is shown. The example electronic device includes a camera 108 which is, in the example, provided on a rear side 104 of the electronic device 101. In this configuration, the camera 108 may be referred to as a rear-facing camera.

The methods and systems described herein can be used with both front facing cameras and rear facing cameras. Thus, while the example embodiment includes a single camera 108, which is rear-facing, the electronic device 101 may, in another embodiment, include one or more front facing cameras instead of, or in addition to, the rear facing camera. A front facing camera is one that is located on the front side 102 (FIG. 1) of the electronic device 101. A front facing camera is oriented to capture images of subjects which are located in front of and/or surrounding the front side 102 of the electronic device 101.

The electronic device 101 includes a flash 110 which is associated with the camera 108. The flash 110 may be one or more light emitting diode (LED), a tube substantially filled with xenon gas, or any other flash device. The flash 110 emits electromagnetic radiation when the flash 110 is triggered. More particularly, the flash 110 may be used to generate a brief bright light which facilitates picture-taking in low light conditions. The flash 110 may be configured to generate at least two types of flashes: a pre-flash and a regular flash. The pre-flash may be a flash that is generated prior to the regular flash.

One or more input interfaces may be provided on the electronic device 101 to allow a user to input a picture request. A picture request is a command instructing the electronic device 101 to acquire an image with a camera 108 associated with the electronic device 101. The input interface may, for example, be a physical or virtual button or key. In some embodiments, a user may also use an input interface to configure settings that will be used when acquiring the image. For example, an input interface may allow a user to set a flash mode for the electronic device 101. The flash mode may be set to a "flash off" mode in which the flash is not triggered before acquiring an image, a "flash on" mode in which the flash is triggered before acquiring an image, or an "auto flash" mode in which the electronic device 101 automatically determines whether to trigger the flash. When the auto flash mode is selected, the electronic device 101 may determine whether low-light conditions exist and, if so, may enable the flash.

Figure 3:
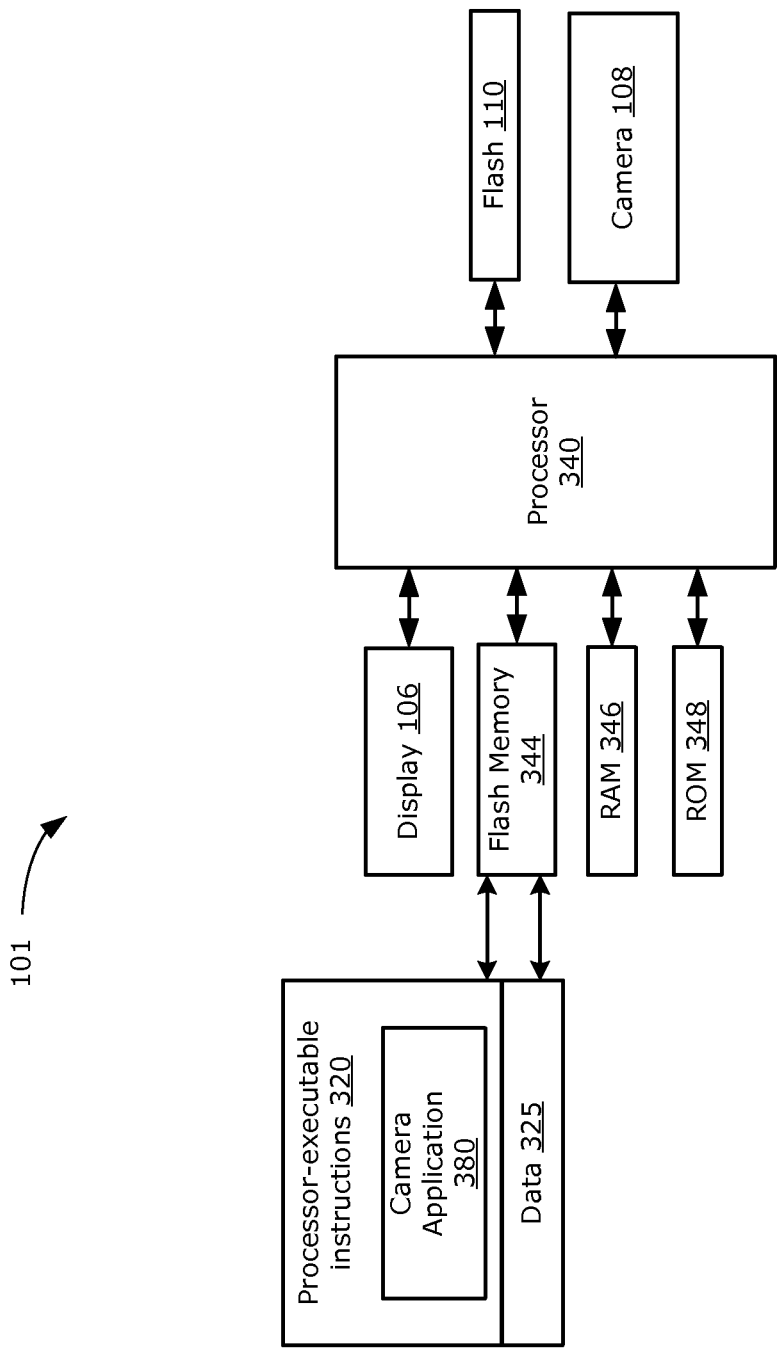
FIG. 3 is a block diagram illustrating an example electronic device in accordance with example embodiments of the present disclosure.

Reference is now made to FIG. 3 which illustrates a block diagram of components of the example electronic device 101.

The electronic device 101 includes a controller including at least one processor 340 (such as a microprocessor) which controls the overall operation of the electronic device 101. The processor 340 may be communicatively coupled with device subsystems such as one or more output interfaces (such as a display 106, a flash 110 and/or a speaker), one or more input interfaces (such as a camera 108, control buttons (not shown), a touch-sensitive overlay (not shown) associated with a touchscreen display and/or other input interfaces), memory (such as flash memory 344, random access memory (RAM) 346, read only memory (ROM) 348, etc.).

The electronic device 101 may include a camera 108 capable of capturing camera data, such as images, in the form of still photo and/or motion data. The camera data may be generated in the form of an electronic signal which is produced by an image sensor associated with the camera 108. In some embodiments, a camera lens may focus a scene or object being photographed onto the image sensor. The camera lens may be positioned at various distances from the image sensor to focus the scene or object onto the image sensor. In some embodiments, the distance between the camera lens and the image sensor may be determined by various autofocus mechanisms.

The camera 108 may also have optoelectronics, including separator lenses and a focus sensor. The camera focus sensor may include one or more focus sensor pairs that may be used for phase detection autofocus (PDAF), and may be referred to as a PDAF sensor. Each focus sensor pair may include a first focus sensor and a second focus sensor. Generally, the separator lenses may direct light coming from opposite sides of a camera lens towards the focus sensor pair. The processor 340 may determine a phase difference between the two images and the processor 340 may cause the camera lens to move towards or away from the camera image sensor based on the determined phase difference.

In some embodiments, each of the first focus sensor and the second focus sensor may be a pixel detector array. For example, the pixel detector array may be a few pixels wide and one or two pixels in height. The relative positions of images on the respective pixel detector arrays may be determined by a cross-correlation algorithm on the luminance patterns reported by the pixel detector arrays (e.g., the first focus sensor and the second focus sensor). As described, the processor 340 may determine a phase difference and may cause the camera lens to move towards or away from the image sensor based on the determined phase difference.

In some embodiments, the camera image sensor is separate from the camera focus sensor. Mirrors within a camera may be used to redirect light rays to both the image sensor and the focus sensor. In some embodiments, one or more focus sensor pairs may be integrated on the camera image sensor. That is, the one or more focus sensor pairs may be integrated on the camera image sensor as dedicated focus sensor pixels alongside image sensor pixels of the camera image sensor.

The electronic device 101 stores data 325 in an erasable persistent memory, which in one example embodiment is the flash memory 344. In some embodiments, the data 325 includes images generated by the camera 108. In some embodiments, the data 325 may include PDAF defocus values or other data generated by focus sensors in the camera 108. In some embodiments, the data 325 may include focus values associated with at least one focus perimeter. As will be described, focus perimeters may be provided in a viewfinder on a display 106.

The processor 340 operates under stored program control and executes processor-executable instructions 320 stored in memory such as persistent memory, for example, in the flash memory 344.

The processor-executable instructions 320 or parts thereof may be temporarily loaded into volatile memory such as the RAM 346. The RAM 346 may be used for storing runtime data variables and other types of data or information. Although specific functions are described for various types of memory, this is merely one example. It will be appreciated that a different assignment of functions to types of memory could also be used.

The processor 340 may be communicatively coupled to the camera 108 to allow the processor 340 to receive electronic signals representing camera data from the camera 108. The processor 340 may also be communicatively coupled to the flash 110 to allow the processor 340 to control the flash 110.

In at least some embodiments, the processor-executable instructions may include one or more camera applications 380 or software modules which are configured to control the camera 108 and the flash 110. The camera application 380 may, for example, be configured to provide a viewfinder on the display 106 by displaying, in real time or near real time, images defined in the electronic signals received from the camera 108. The camera application 380 may be configured to store the images or videos to memory, for example the flash memory 344. The images may be stored in various formats including JPEG, RAW, BMP, etc. The camera application 380 may be configured to receive data from one or more image and/or focus sensors of the camera 108 for use with autofocus methods described herein.

In some embodiments, the camera application 380 may provide the viewfinder on the display 106 with one or more focus perimeters. As will be described, the camera application 380 may provide one or several focus perimeters on the viewfinder. Each of the focus perimeters may define a region of interest, and a focus perimeter may be referred to as a "region of interest". The processor 340 may utilize characteristics of a scene or object within one or more focus perimeters to determine and/or control any one or more of a number of various camera related features, options or settings.

In some embodiments, one focus perimeter may be provided in the center of the viewfinder. In some embodiments, two or more focus perimeters may be provided. For example, two or more focus perimeters may be arranged in a two-dimensional grid format (e.g., a 2×2 grid). The grid may be centrally located on the viewfinder but may not occupy all of the viewfinder. In some embodiments, the two or more focus perimeters may be arranged in a one-dimensional array. In some embodiments, each of the two or more focus perimeters may be arranged on the viewfinder in any other configuration.

The camera application 380 may, in various embodiments, determine and/or control any one or more of a number of various camera related features, options or settings including, for example, the flash 110, a digital zoom feature (which may crop an image to a centered area with the same aspect ratio as the original), an image stabilization feature, a shutter speed, a camera lens aperture, a focal length, high dynamic range settings such as a long exposure time and a short exposure time, a white balance setting and other camera configuration settings. In some embodiments, the focal length may be adjusted by lens movement. Lens movement contributes to focusing a scene or object onto an image sensor. At least some of the features may be automatically determined by the camera application 380. That is, at least some of these settings may be determined without direct user input setting such settings.

While the embodiment discussed above includes a processor 340 coupled with a camera application 380 which collectively act as an image signal processor to provide image related functions, in other example embodiments (not shown), another processor such as a dedicated image signal processor, may provide some or all of these functions. That is, an image signal processor may be configured to perform the functions of the camera application 380 or a portion thereof.

For example, the camera 108 may be a digital camera provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as a Serial Peripheral Interface (SPI) or Inter-Integrated Circuit (I2C) interface for connecting to a printed circuit board (PCB) of the electronic device 101. The controller provided on the IC may be configured to perform some or all of the features of the methods described herein.

Furthermore, while the camera application 380 has been illustrated as a stand-alone application, in at least some example embodiments, the functions of the camera application 380 may be provided by a plurality of software modules. In at least some example embodiments, the software modules may be divided among multiple applications.

Further, while the memory which stores the processor-executable instructions 320 has been illustrated using a block that is separate from the processor 340, in practice, the memory storing the processor-executable instructions 320 may be provided on-board the processor 340. That is, the processor 340 may include internal memory and the processor-executable instructions may be provided on the internal memory.

The electronic device 101 may include other components apart from those illustrated in FIG. 3. By way of example, the electronic device 101 may include or be connected to a power source, such as a battery, which provides power to various components of the electronic device.

Reference will now be made to FIGS. 4A, 4B and 4C which illustrate signals from a focus sensor pair associated with a PDAF sensor. Referring to FIG. 4A, a camera lens barrel 402 is shown as including a camera lens. The camera lens is at a first lens position 404A within the camera lens barrel 402. Images captured by each sensor in a focus sensor pair may be illustrated as signals 406, 408. For example, the first signal 406 may represent a luminance pattern captured by a first focus sensor. The first focus sensor may receive light coming from a left side of the camera lens. The second signal 408 may, for example, represent a luminance pattern captured by a second focus sensor. The second focus sensor may receive light coming from a right side of the camera lens. Although the first focus sensor and the second focus sensor are described as receiving light coming from a left side and a right side of the camera lens, respectively, the first focus sensor and the second focus sensor may receive light coming from any opposing sides of the camera lens, respectively. For example, the first focus sensor may receive light coming from a top side of the camera lens and the second focus sensor may receive light coming from a bottom side of the camera lens. The processor 340 may determine a phase difference based on the signals 406, 408.

Referring now to FIG. 4B, the lens is in a second lens position 404B within the camera lens barrel 402. That is, the processor 340 may have configured the lens to move from a first lens position 404A to a second lens position 404B. While the lens is in the second lens position 404B, the signals 406, 408 are illustrated in FIG. 4B to nearly overlap. As illustrated in FIG. 4B, the phase difference between the image captured by the first focus sensor and the image captured by the second focus sensor in the focus sensor pair may be very small. In some embodiments, the processor 340 may determine whether the phase difference is less than a focus threshold and, if the phase difference is less than the focus threshold, the processor 340 may determine that the scene or object being photographed is correctly focused onto the camera image sensor.

Referring now to FIG. 4C, the processor 340 may configure the lens to further move from the second lens position 404B to a third lens position 404C. While the lens is in the third lens position 404C, the signals 406, 408 may further separate. That is, as illustrated in FIG. 4C, the phase difference between the image captured by the first focus sensor and the image captured by the second focus sensor in the focus sensor pair may increase.

As shown in FIGS. 4A, 4B and 4C, the phase difference between images captured at the focus sensor pair, illustrated as signals 406, 408, may be correlated to the position of the lens within the camera lens barrel. When the phase difference between the images captured at the focus sensors is zero or very small, the scene or object being photographed may be in focus on the camera image sensor. In some embodiments, the processor 340 may determine a distance that the camera lens may move within the camera lens barrel 402 to decrease the phase difference between the respective images captured at the focus sensor pair. That is, the processor 340 may utilize phase detection autofocus to determine movement of a lens for focusing a scene or object being photographed onto a camera image sensor.

In some embodiments, a macro lens position and an infinity lens position may be defined for the lens barrel 402. The macro lens position may be the lens position for optimally focusing an object positioned very near the camera lens. In some embodiments, the macro lens position may optimally focus an object positioned less than 0.5 meters from the camera lens. In some embodiments, the infinity lens position may be the lens position for optimally focusing an object or scene greater than 2 meters away from the camera lens.

In some embodiments, the macro lens position may be the position at the left most edge of the lens barrel 402 of FIGS. 4A, 4B and 4C. That is, when the camera lens is positioned against the left most edge of the lens barrel 402, the lens is in the macro lens position. In contrast, the infinity lens position may be the position at the right most edge of the lens barrel 402 of FIGS. 4A, 4B, 4C. That is, when the camera lens is positioned against the right most edge of the lens barrel 402, the lens is in the infinity lens position. Although the macro lens position and the infinity lens position are described as being at the left most edge and the right most edge of the lens barrel 402, depending on the design of the camera lens and lens barrel 402, the macro lens position and the infinity lens position could be defined as being at any other position to achieve the macro lens position and the infinity lens position.

Figure 5A:
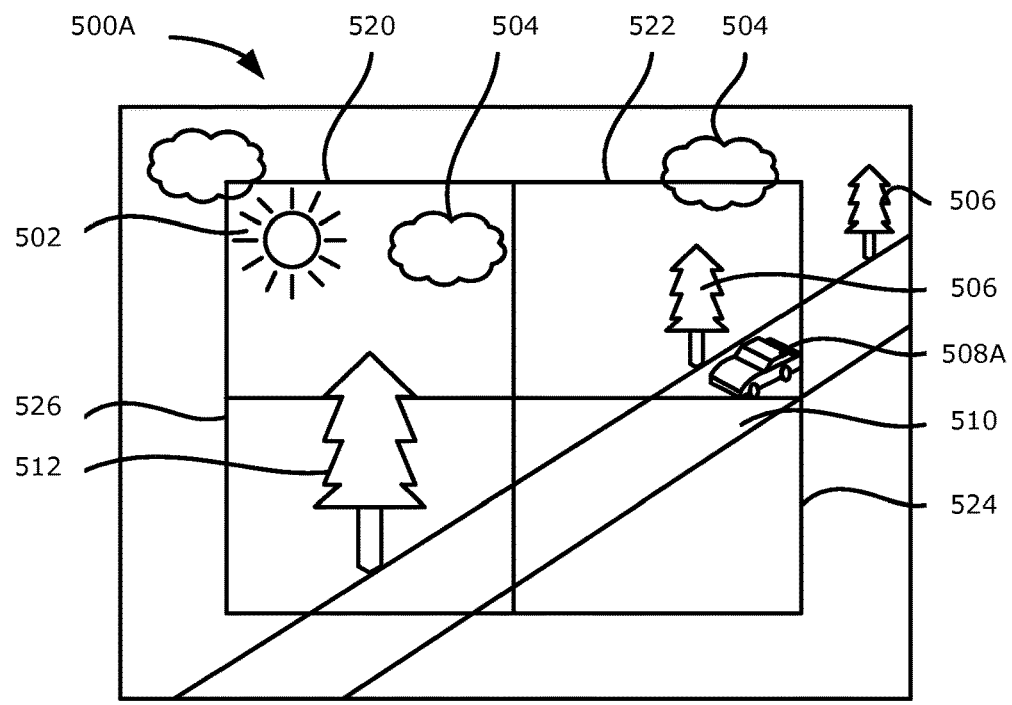
FIGS. 5A and 5B illustrate example viewfinders of an imaging device in accordance with example embodiments of the present disclosure.
Figure 5B:
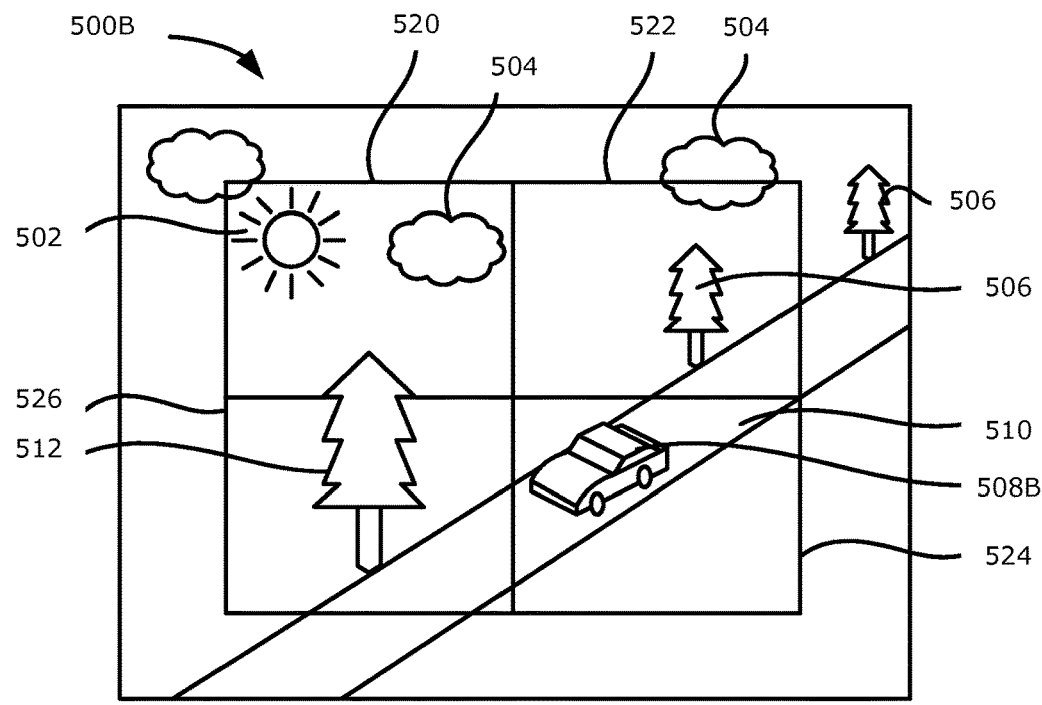

Reference will now be made to FIGS. 5A and 5B which illustrate viewfinders 500A, 500B of an imaging device in accordance with example embodiments of the present disclosure. In some embodiments, the viewfinders 500A, 500B may be provided on the display 106 of an electronic device 101.

In FIGS. 5A and 5B, several focus perimeters 520, 522, 524, 526 are provided. In some embodiments, the focus perimeters 520, 522, 524, 526 may be positioned in a two-dimensional grid arrangement. Each focus perimeter may be of a predetermined size and, in at least some embodiments, may be positioned at a predetermined location on the viewfinder. For example, as illustrated in FIGS. 5A and 5B, the focus perimeters 520, 522, 524, 526 may be arranged in a centrally located 2×2 grid configuration. In some embodiments, the focus perimeters 520, 522, 524, 526 may be arranged in a 1×4 grid configuration (not shown). In some embodiments, each of the focus perimeters 520, 522, 524, 526 may be positioned at a different corner of the viewfinder (not shown) or may be positioned as defined by the user (not shown).

In some embodiments (not shown), the focus perimeters 520, 522, 524, 526 may collectively cover every portion of the viewfinder 500A, 500B. In some embodiments, the focus perimeters 520, 522, 524, 526 may collectively cover approximately 15 to 20% of the area of the viewfinder 500A, 500B. In various embodiments, however, the focus perimeters 520, 522, 524, 526 may collectively cover any percentage of area of the viewfinder 500A, 500B.

Although FIGS. 5A and 5B illustrate four focus perimeters 520, 522, 524, 526 on the viewfinder, any number of focus perimeters may be provided. In some embodiments, for example, the processor 340 may only provide one focus perimeter for the viewfinder. In some embodiments, the processor 340 may provide four focus perimeters, as illustrated in FIGS. 5A and 5B. In some embodiments, the processor 340 may provide eight focus perimeters Each of the provided focus perimeters may be of any size. In some embodiments, a focus perimeter in the group of focus perimeters may be of a different size than another focus perimeter in the group of focus perimeters.

In some embodiments, the focus perimeters 520, 522, 524, 526 may be positioned in the central portion of the viewfinder 500A, 500B, as illustrated in FIGS. 5A, 5B. In other embodiments, the focus perimeters 520, 522, 524, 526 may be positioned at a side portion of the viewfinder 500A, 500B. In some embodiments, the focus perimeters 520, 522, 524, 526 may be positioned on the viewfinder 500A, 500B based on user input (e.g., user input may control the location of the focus perimeters).

FIG. 5A illustrates a viewfinder 500A displaying a scene that may be or is being photographed by the electronic device 101. For example, a background scene may include a sun 502, clouds 504 and background trees 506. That is, objects in the background scene may be located at a distance greater than 2 meters from the camera lens of the electronic device 101. FIG. 5A illustrates an automobile 508A at a point in time. The automobile 508A may be traveling on a road 510 that leads from the background scene to a foreground scene. In some embodiments, the foreground scene may include objects that are located at a distance less than 1 meter from the camera lens of the electronic device 101. For example, a foreground tree 512 may be positioned in a lower left focus perimeter 526 and located less than 1 meter from the camera lens of the electronic device 101. That is, among the group of objects including the sun 502, clouds 504, background tree 506, automobile 508A at the specific point in time and the foreground tree 512, the foreground tree 512 may be the object nearest to the camera lens. Although the objects being photographed are described as being located at a distance greater than 2 meters from the camera lens or described as being located at a distance less than 1 meter from the camera lens, FIGS. 5A and 5B are not drawn to scale and are drawn for illustrative purposes only.

FIG. 5B illustrates a viewfinder 500B displaying a scene being photographed by the electronic device 101. Similar to FIG. 5A, FIG. 5B illustrates a background scene that may include a sun 502, clouds 504, and background trees 506. FIG. 5B further illustrates an automobile 508B that may be at a second point in time. The second point in time may be a time after the first point in time, such as after seconds or minutes have elapsed. The automobile 508B may have traveled on the road 510 from the background scene towards a foreground scene. Further, as illustrated in FIG. 5B, the automobile 508B may now be shown in a different focus perimeter 524. That is, in FIG. 5A, the automobile 508A was shown in a focus perimeter 522 in the upper right corner of the 2×2 focus perimeter grid. In FIG. 5B, the automobile 508B is shown in a focus perimeter 524 in the lower right corner of the 2×2 focus perimeter grid. Further, the automobile 508B illustrated in FIG. 5B may be nearer to the camera lens relative to the automobile 508A illustrated in FIG. 5A. That is, the automobile 508A, 508B may have traveled along the road 510, where the road 510 leads to a position that is nearer to the camera lens.

In some embodiments, each of the focus perimeters 520, 522, 524, 526 may be associated with at least one pair of phase detection autofocus (PDAF) sensors, which may collectively be provided on a single PDAF sensing chip such as on an image sensor with onboard PDAF sensing. That is, in FIGS. 5A and 5B, the upper left focus perimeter 520 may be associated with one or more focus sensor pairs, the upper right focus perimeter 522 may be associated with one or more focus sensor pairs, the lower right focus perimeter 524 may be associated with one or more focus sensor pairs and the lower left focus perimeter 526 may be associated with one or more focus sensor pairs. In some embodiments, the one or more focus sensor pairs may be phase detection autofocus sensor pairs. As will be described, the processor 340 may obtain focus values associated with the focus perimeters 520, 522, 524, 526. Each focus value may include a magnitude and a direction for determining movement of a camera lens to optimally focus a scene or object onto a camera image sensor. The magnitude indicates the amount of movement of the lens while the direction indicates the direction of movement of the lens. As will be described, the magnitude and the direction for determining movement of the lens are determined based on data obtained from the focus sensor pairs.

In some embodiments, the electronic device 101 having the camera 108 may utilize phase detection autofocus to determine lens movement for focusing a scene or object being photographed onto a camera image sensor. In some embodiments, when a scene being photographed, for example as illustrated in FIG. 5A, includes many objects positioned at various distances from the camera lens, the processor 340 may be unable to determine lens movement for optimally focusing every object onto the camera image sensor. For example, if the processor 340 were to try to focus the camera on a distance that is at the midpoint of all objects in the scene, all of the objections could appear out of focus. By way of further example, the processor 340 could configure the lens at a position that focuses objects located at a distance to the camera lens that is mid-way between a background scene object, such as a cloud 504 in the sky, and a foreground scene object, such as a foreground scene tree 512. In this example, neither the cloud 504 or the background sky scene nor the foreground scene tree 512 may be optimally focused onto the camera image sensor. A method for autofocusing may, therefore, be useful for preventing a lens position that is neither optimal for a foreground scene object nor a background scene object.

Figure 6:
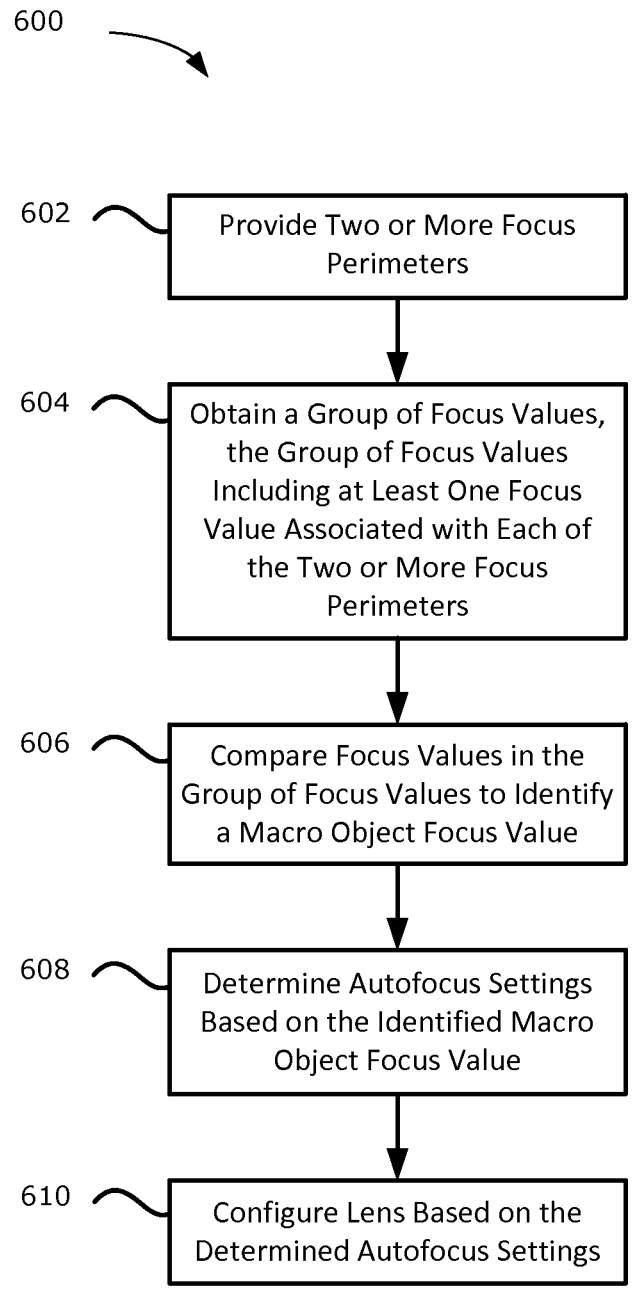
FIG. 6 is a flowchart illustrating an example method of autofocusing a macro object by an imaging device.

Reference will now be made to FIG. 6 which illustrates a flowchart of an example method of autofocusing a macro object by an imaging device. The method 600 may be performed by an electronic device 101 of the type described above with reference to FIGS. 1 to 3 or a variation of such electronic devices. For example, in at least some embodiments, processor-executable instructions 320, such as a camera application 380, may configure a processor 340 of the electronic device 101 to perform the method 600.

The method 600 may be based on phase detection autofocus mechanisms. For example, phase detection autofocus may be used to configure one or more lenses of the camera 108 to accurately focus an identified macro object onto an image sensor of the camera 108.

At 602, the processor 340 may provide two or more focus perimeters 520, 522, 524, 526 in a viewfinder 500A, 500B. As described and illustrated in FIGS. 5A and 5B, in some embodiments, the focus perimeters 520, 522, 524, 526 may be arranged in a 2×2 grid and positioned in the center of the viewfinder 500A, 500B. Although the focus perimeters 520, 522, 524, 526 are illustrated as collectively covering greater than 50 percent of the total area of the viewfinder 500A, 500B, in some embodiments, for example, the processor 340 may provide the focus perimeters 520, 522, 524, 526 for collectively covering approximately 15 to 20 percent of the total area of the viewfinder 500A, 500B.

In some embodiments, each of the two or more focus perimeters 520, 522, 524, 526 is associated with at least one pair of phase detection autofocus sensors. In some embodiments, the processor 340 may obtain at least one focus value associated with each of the two or more focus perimeters 520, 522, 524, 526. Each of the focus values may include a magnitude and a direction for determining movement of a camera lens. In some embodiments, the magnitude and direction are determined based on data obtained from the phase detection autofocus sensors.

Accordingly, at 604, the processor may obtain a group of focus values. The group of values may include at least one focus value associated with each of the two or more focus perimeters 520, 522, 524, 526. As described, each focus value in the group of focus values may include a magnitude and a direction for determining movement of the lens and the magnitude and direction may be provided due to the use of PDAF sensors.

Figure 7:
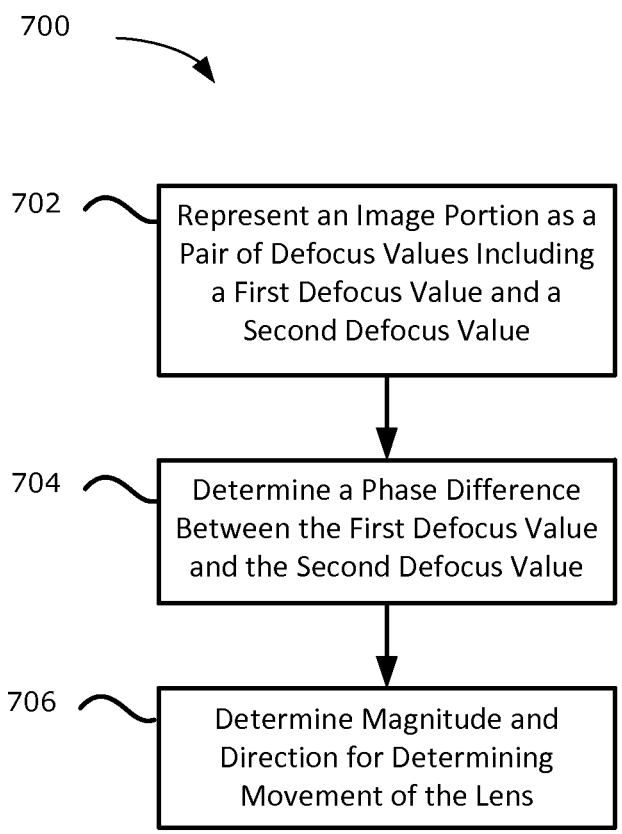
FIG. 7 is a flowchart illustrating an example method of obtaining focus values.

Reference will now be briefly made to FIG. 7 which illustrates a flowchart of an example method 700 of obtaining focus values. The method 700 may be performed by an electronic device 101 of the type described above with reference to FIGS. 1 to 3 or a variation of such electronic devices. For example, in at least some embodiments, processor-executable instructions 320, such as a camera application 380, may configure a processor 340 of the electronic device 101 to perform the method 700. The method 700 may be performed at 604 of the method 600 in FIG. 6.

The method 700 may be performed by the processor 340 to obtain a group of focus values. That is, for each of the two or more focus perimeters 720, 722, 724, 726, the processor 340 may obtain at least one focus value associated with each of the two or more focus perimeters 720, 722, 724, 726 by the method 700.

At 702, the processor 340 may represent an image portion as a pair of defocus values. A pair of defocus values may include a first defocus value and a second defocus value. For example, the defocus values may be a numerical representation based on signals 406, 408. Similar to the description of FIGS. 4A, 4B, 4C, the first defocus value may represent a scene feature captured through a left side of a camera lens and focused onto a first focus sensor of a focus sensor pair. The second defocus value may represent a scene feature captured through a right side of a lens and focused onto a second focus sensor of a focus sensor pair. In some embodiments, defocus values may represent the extent that an image forming plane, such as at the camera image sensor, is offset from the estimated focal plane of the scene or object being photographed as provided by the current camera lens position. That is, defocus values may represent a relative positional offset quantity or distance between the image sensor plane and the image plane provided by the current camera lens position.

At 704, the processor 340 may analyze the image data captured at the first focus sensor and at the second focus sensor and determine how much the image captured at the first focus sensor is shifted relative to the image captured at the second focus sensor. That is, the processor 340 may determine a phase difference between the first defocus value and the second defocus value. In some embodiments, the processor 340 may determine the phase difference using a cross-correlation or auto-correlation algorithm.

At 706, the processor 340 may determine a magnitude and a direction for determining movement of the lens based on the phase difference between the first defocus value and the second defocus value. For example, the phase difference between the first defocus value and the second defocus value may provide the processor 340 information for determining a magnitude and direction of lens movement necessary to bring the scene or object being photographed into focus on the camera image sensor.

For example, referring again to FIG. 4A, the processor 340 may determine that when the camera lens is in a first lens position 404A, a phase difference exists between signals 406, 408 based on images captured by a pair of focus sensors. The processor 340 may determine that the camera lens may need to move to lens in a direction towards a second lens position 404B to decrease the phase difference between signal 406 and signal 408. Further, the processor 340 may determine that the camera lens may need to move the lens by a determined distance towards lens position 404B.

Accordingly, referring again to FIG. 6, the processor 340 may, at 604, obtain focus values to form the group of focus values. In some embodiments, the processor 340 may obtain one or more focus values (i.e., at least one magnitude and one direction) for each of the focus perimeters 520, 522, 524, 526 using the method 700 described in FIG. 7.

In at least some embodiments, the magnitudes and directions are relative magnitudes and directions which indicate an amount of lens movement and a direction of lens movement relative to the current lens position.

At 606, the processor 340 may compare the focus values in the group of focus values to identify a macro object focus value. In some embodiments, the processor 340 may identify the macro object focus value by identifying a focus value in the group of focus values associated with an object being photographed that is nearest to the lens (i.e., nearer than the distance indicated by any of the other of the focus values in the group). The magnitude and direction values are both used in order to identify which of the focus perimeters contains the most macro object. That is, the magnitude and direction for each focus perimeter may be analyzed to determine which magnitude and direction represents the most macro position of the lens. By way of example, in at least some embodiments, the focus values are signed values and the sign indicates the direction of movement, while the number indicates the amount of movement. In some embodiments, the lowest number (i.e. the most negative number) indicates the most macro focus value and, at 606, the processor 340 identifies the most macro focus value by looking for the most negative focus value. Thus, the processor 340 identifies the focus perimeter having the most macro object by looking for the focus value representing the most macro position.

By way of example, referring again to FIGS. 5A and 5B, of the objects within the focus perimeters 520, 522, 524, 526, the processor 340 may determine that the foreground tree 512 may be an object being photographed nearest to the lens. That is, the distance between the foreground tree 512 and the camera lens is less than the distance between the background tree 506 (or the cloud 504) and the camera lens.

Continuing with the present example, as described, the processor 340, at 604, may have obtained at least one focus value associated for the lower left focus perimeter 526 in viewfinder 500A. The obtained focus value may include a magnitude and a direction for moving the camera lens from its current position to a new position within the lens barrel 402 for optimally focusing the foreground tree 512 onto the camera image sensor.

In some embodiments, the processor 340 may determine a macro object focus value by comparing the focus values in the group of focus values based on the magnitude and the phase of each focus value and based on the current position of the lens within the lens barrel 402. For example, as described, the lens barrel 402 may have a macro lens position and an infinity lens position. The macro lens position may refer to a lens position for optimally focusing objects nearest to the camera lens onto the camera image sensor. The infinity lens position may refer to a lens position for optimally focusing objects located at a relatively greater distance away from the camera lens onto the camera image sensor. Accordingly, the processor 340 may determine the macro object focus value by determining the focus value that would move the lens to a position within the lens barrel 402 in closest proximity to the macro lens position.

At 608, the processor 340 may determine autofocus settings based on the macro object focus value. In some embodiments, the processor 340 may determine a lens focal length for optimally focusing the object associated with the macro object focus value onto the camera image sensor. In some embodiments, the processor 340 may determine a lens aperture setting for optimally focusing the object associated with the macro object focus value onto the camera image sensor. In some embodiments, the processor 340 may determine a combination of a lens focal length and a lens aperture setting for optimally focusing the object associated with the macro object focus value onto the camera image sensor. That is, the processor 340 may associate autofocus settings with focus values, where the autofocus settings associated with a particular focus value may be for optimally focusing the object associated with the focus value on the camera image sensor.

In some embodiments, the processor may, at 608, only rely on the macro object focus value and may ignore other focus values (i.e. only the focus value associated with the perimeter having the macro object is used and the other of the focus values may simply be ignored). In some embodiments, the processor 340 may effectively cause the other focus values to be ignored by adjusting a confidence value associated with those focus values. For example, in one embodiment, the PDAF sensor outputs a focus value for each focus perimeter (i.e. a magnitude and direction) and also a confidence value. The processor 340 may generally ignore focus values (i.e., not use those focus values to determine autofocus settings) if the confidence value is less than a threshold. In some such embodiments, the processor 340 may set the confidence value for the focus perimeters that do not contain the macro object to a value that is less than the threshold. That is, the confidence values for such focus perimeters may be set to indicate low confidence. The processor 340 may then determine autofocus settings based on focus values associated with a high confidence value and correspondingly drop or minimize usage of focus values associated with a low confidence value.

At 610, the processor 340 may configure the camera lens based on the determined autofocus settings. In some embodiments, the processor 340 may cause the lens to move towards or away from the camera image sensor. In some embodiments, the processor 340 may cause the lens aperture to become wider or narrower or altered in another respect for optimally focusing the object associated with the macro object focus value onto the camera image sensor.

As described, in some embodiments, the processor 340 may, at 608, determine autofocus settings based on the identified macro object focus value and may, at 610, configure the camera lens based on the determined autofocus settings. In some embodiments, however, there may be objects in a scene being photographed that may not be nearest to the camera lens but may still be sufficiently near the identified macro object to warrant being brought into focus on the camera image sensor. Referring again to FIG. 5B, the processor 340 may determine the macro object focus value to be associated with the foreground tree 512. That is, among the objects captured by the focus perimeters 520, 522, 524, 526, the foreground tree 512 may be the object nearest to the camera lens. Further, the processor 340 may determine that the distance between the automobile 508B in the lower right focus perimeter 524 and the camera lens may be 10 percent greater than the distance between the foreground tree 512 (determined to be the macro object in the viewfinder) and the camera lens. Accordingly, a method for autofocusing a macro object based on nearby objects may, therefore, be useful. That is, the processor 340 may not automatically disregard focus values in focus perimeters that are not identified to contain a macro object.

Figure 8:
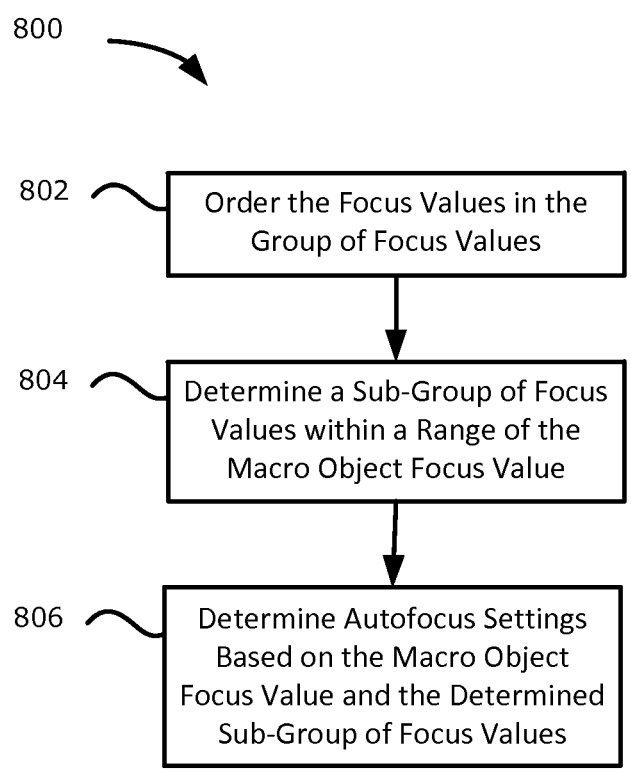
FIG. 8 is a flowchart illustrating an example method of comparing focus values.

Reference will now be made to FIG. 8 which illustrates a flowchart of an example method 800 of comparing focus values. The method 800 may be performed by an electronic device 101 of the type described above with reference to FIGS. 1 to 3 or a variation of such electronic devices. For example, in at least some embodiments, processor-executable instructions 320, such as a camera application 380, may configure a processor 340 of the electronic device 101 to perform the method 800. In some embodiments, the method 800 may be performed at 606 and at 608 of the method 600 in FIG. 6.

At 802, the processor 340 may order the focus values in the group of focus values (i.e., the group that contains a focus value for each focus perimeter). In some embodiments, the processor 340 may order the focus values according to the distance between the associated objects being photographed and the camera lens. For example, the focus value associated with an object identified as being a macro object (or nearest to the camera lens) may be listed first. Focus values associated with objects identified as being at successive distances further away from the camera lens may be subsequently listed. That is, a focus value associated with an object furthest away from the camera lens may be listed at the bottom of the list. Although the processor 340 may order the focus values according to the distance between the associated objects and the camera lens, the processor 340 may order the focus values in other ways. For example, in some embodiments, the processor 340 may initially order focus values into groups according to associated focus perimeters 520, 522, 524, 526 and subsequently order focus values into groups according to the distance between the associated objects and the camera lens.

At 804, the processor 340 may determine a sub-group of focus values within a range of the macro object focus value. In some embodiments, the processor 340 may define a sub-group of focus values as being the focus values having a distance between the associated object and the camera lens that is within 115 percent of the distance between an identified macro object and the camera lens. For example, if an identified macro object is 0.50 meters away from the camera lens, the processor 340 may define the sub-group of focus values as any focus value associated with objects that are located within 0.575 meters (e.g., 0.50 meter× 1.15=0.575 meters) of the camera lens.

As noted above, in some embodiments, confidence values may be used in order to affect which focus values will be used to calculate autofocus settings. In some such embodiments, the processor 340 may assign a high confidence value to the identified macro object focus value. The processor 340 may assign a medium confidence value to the identified focus values in the sub-group of focus values. Further, in some embodiments, the processor 340 may assign a low confidence value to focus values not identified as a macro object focus value and to focus values not identified as in the sub-group of focus values. In some embodiments, the processor 340 may be configured to determine autofocus settings based on focus values associated with high confidence values and medium confidence values and correspondingly drop or minimize usage of focus values associated with a low confidence values.

Accordingly, at 806, the processor 340 may determine autofocus settings based on the identified macro object focus value and the determined sub-group of focus values. Continuing with the example above, the processor 340 may determine autofocus settings based on the object associated with the macro object focus value and any objects associated with the determined sub-group of focus values. That is, the determined autofocus settings, such as camera lens focal length and camera lens aperture settings, may be chosen to optimally and collectively focus the macro object and objects associated with the sub-group of focus values onto the camera image sensor. As described, in some embodiments, the determined autofocus settings may be a combination of camera lens focal length and aperture settings.

In some embodiments, the processor 340 may determine autofocus settings using a weighted average scheme according to the confidence value assigned to focus values in the group of focus values. For example, the processor 340 may determine autofocus settings by assigning a greater weight to the identified macro object focus value having a high confidence value and lesser but substantial weight to identified focus values associated with a medium confidence value. In the present example, the processor 340 may determine autofocus settings by assigning little or no weight to identified focus values associated with a low confidence value.

In another example, it may be apparent that the method 800 of FIG. 8 may be useful for photographing several baseball players arranged in three successive rows. The first row of baseball players may be nearest to the camera lens. The second row of baseball players may be further away from the camera lens. The third row of baseball players may be furthest away from the camera lens. Rather than only optimally determining autofocus settings for focusing the first row of baseball players onto the camera image sensor, the processor 340 may execute the method 800 of FIG. 8 to determine autofocus settings to optimally focus all baseball players in the three rows onto the camera image sensor.

In some embodiments, the processor 340 may display the viewfinder 500A, 500B on the display 106 of the electronic device 101 prior to capturing a photograph of a scene or object. In some embodiments, before the processor 340 may capture a photograph of a scene or object, the scene or object being framed in the viewfinder may change. In an example, referring again to FIGS. 5A and 5B, the automobile may be framed in the top right focus perimeter 522 of the viewfinder 500A at a first point in time. The automobile may subsequently be framed in the bottom right perimeter 524 of the viewfinder 500A at a second point in time. Accordingly, before the electronic device 101 captures a photograph of the scene, a method of determining updated autofocus settings based on the changed scene may, therefore, be useful.

Figure 9:
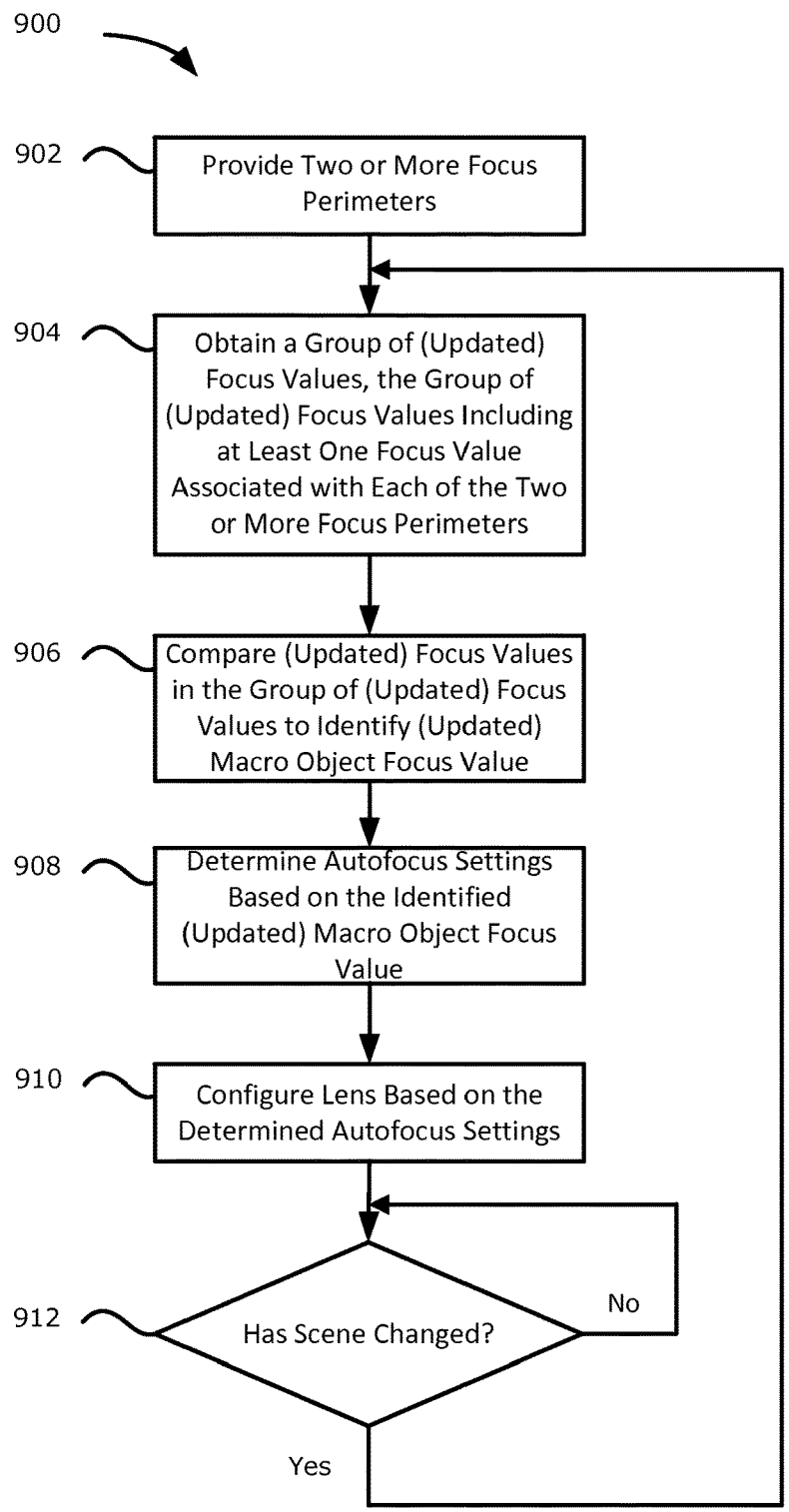
FIG. 9 is a flowchart illustrating an example method of determining updated autofocus settings.

Reference is now made to FIG. 9 which illustrates a flowchart of an example method 900 of determining updated autofocus settings. The method 900 may be performed by an electronic device 101 of the type described above with respect to FIGS. 1 to 3 or a variation of such electronic devices. For example, in at least some embodiments, processor-executable instructions 320, such as a camera application 380, may configure a processor 340 of the electronic device 101 to perform the method 900.

The method 900 at 902, 904, 906, 908, and 910 may correspond to and be similar to those of method 600 at 602, 604, 606, 608 and 610, respectively. That is, the processor 340 may provide two or more focus perimeters, at 902, obtain a group of focus values, at 904, compare focus values, at 906, determine autofocus settings based on an identified macro object focus value, at 908, and configure a camera lens based on the determined autofocus settings at 910.

At 912, the processor 340 may determine whether the scene in the viewfinder 500A, 500B has changed. In some embodiments, the processor 340 may determine whether the scene in the viewfinder 500A, 500B has changed by retrieving pixel data from the camera image sensor. For example, the processor 340 may determine whether luminance data of each pixel is changing. In some embodiments, the processor 340 may determine whether a scene is changing by retrieving data from sensors for detecting movement of the electronic device 101. For example, sensors for detecting movement of the electronic device 101 may include gyroscopes or accelerometers. In some embodiments, if data from sensors for detecting movement indicates that the electronic device 101 is moving or has moved, the processor 340 may determine that the scene being framed within the viewfinder 500A, 500B has changed. If data from the sensors for detecting movement indicates that the electronic device 100 is not moving or has not moved, the processor 340 may determine that the scene may or may not have changed. The processor 340 may then examine luminance data to determine whether the scene is stable. That is, in some embodiments, the processor 340 may determine whether the scene has changed based on analysis of a combination of pixel data and data from movement sensors.

At 912, if the processor 340 determines that the scene has not changed, the processor 340 continues to monitor for the presence of a scene change. For example, if the processor 340 determines that the scene has not changed, updated autofocus settings may not be required.

At 912, if the processor 340 determines that the scene has changed, the processor may, at 904, obtain a group of updated focus values. The group of updated focus values may include at least one updated focus value associated with each of the two or more focus perimeters 520, 522, 524, 526. Each updated focus value in the group of updated focus values may include a magnitude and a direction for determining movement of the lens.

Further, at 906, the processor 340 may compare the updated focus values in the group of updated focus values to identify an updated macro object focus value. At 908, the processor may determine updated autofocus settings based on the identified updated macro object focus value. At 910, the processor 340 may configure the camera lens based on the determined updated autofocus settings.

As illustrated in the foregoing discussion of method 900, when the processor 340 detects a change in the scene framed on the viewfinder 500A, 500B, the processor 340 may update the group of focus values by re-determining focus values for each of the focus perimeters 520, 522, 524, 526.

In some embodiments, the processor 340 may continually execute the method 900 for tracking and autofocusing a macro object. That is, in some embodiments, the processor 340 may continually monitor for movement of an identified macro object in the focus perimeters 520, 522, 524, 526. In some embodiments, the processor 340 may continually monitor for new objects introduced to the focus perimeters 520, 522, 524, 526. For example, the processor 340 may continually monitor for updated macro objects on a focus perimeter basis.

Figure 10:
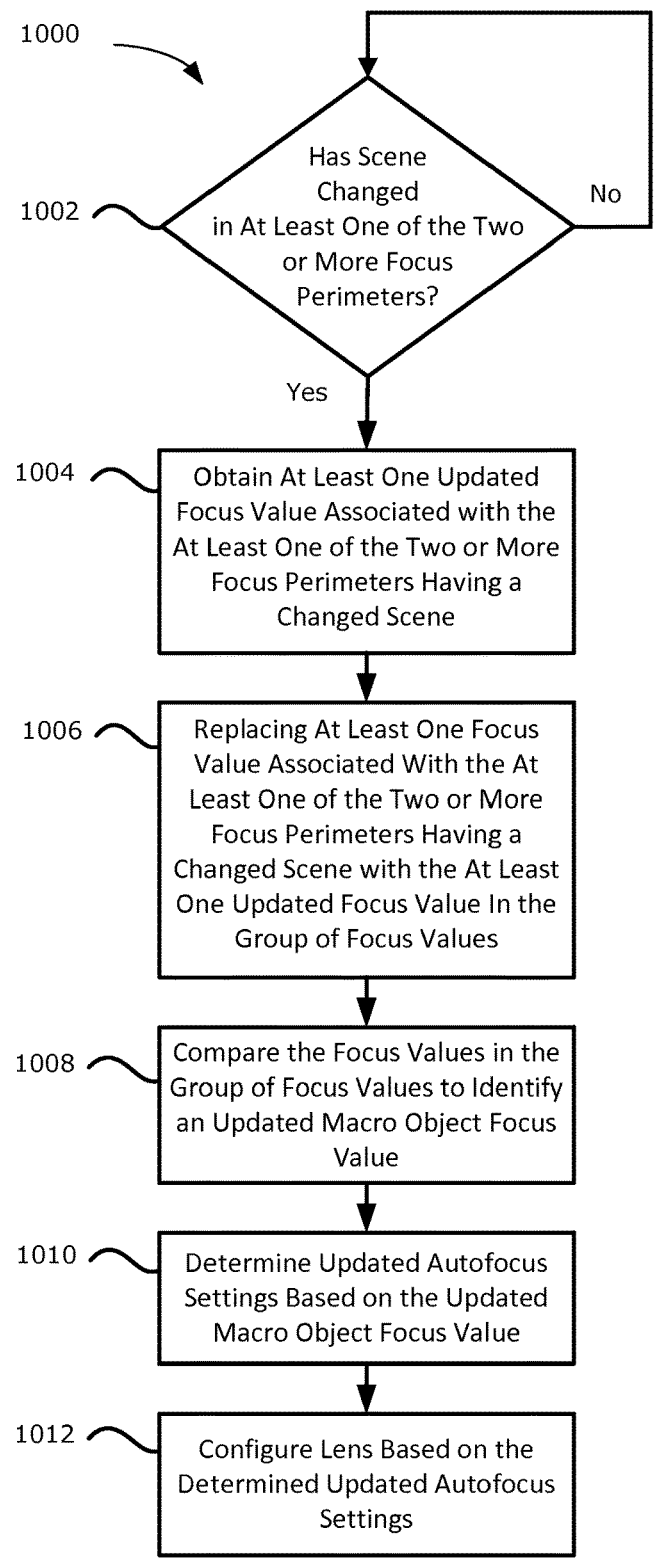
FIG. 10 is a flowchart illustrating an example method of determining updated autofocus settings.

Reference will now be made to FIG. 10 which illustrates a flowchart of another example method 1000 of determining updated autofocus settings. The method 1000 may be performed by an electronic device 101 of the type described above with reference to FIGS. 1 to 3 or a variation of such electronic devices. For example, in at least some embodiments, processor-executable instructions 320, such as a camera application 380, may configure a processor 340 of the electronic device 101 to perform the method 1000.

At 1002, the processor 340 may detect a changed scene in at least one of the two or more focus perimeters 520, 522, 524, 526. The processor 340 may determine whether the scene in at least one of the two or more focus perimeters 520, 522, 524, 526 has changed by retrieving pixel data from the camera image sensor. For example, similar to the description of method 900 at 912, the processor 340 may determine whether luminance data of each pixel in at least one of the two or more focus perimeters 520, 522, 524, 526 is changing or has changed. Further, similar to the description of method 900 at 912, the processor 340 may determine whether a scene is changing or has changed by retrieving data from sensors for detecting movement of the electronic device 101 (e.g., a gyroscope).

At 1002, if the processor 340 determines the scene has not changed, the processor 340 continues to monitor for the presence of a scene change.

At 1002, if the processor 340 determines that the scene is changing or has changed, at 1004, the processor 340 may obtain at least one updated focus value associated with the at least one of the two or more focus perimeters having a changed scene. That is, in some embodiments, the processor 340 may determine whether a portion of a scene in a viewfinder 500A, 500B has changed.

For example, referring again to FIGS. 5A and 5B, FIGS. 5A and 5B may illustrate a scene at two different points in time. That is, FIG. 5A may illustrate the scene at a first point in time. The automobile may be framed in the upper right focus perimeter 522. FIG. 5B may illustrate the scene at a second point in time. The automobile may be framed in the lower right focus perimeter 524. That is, the automobile 508A, 508B may have traveled along the road 510 from a first automobile position to a second automobile position. Accordingly, at 1004, the processor 1004 may obtain at least one updated focus value associated with the upper right focus perimeter 522 and may obtain at least one updated focus value associated with the lower right focus perimeter 524. Accordingly, at 1004, the processor 340 may only obtain updated focus values for focus perimeters in which the scene portion may have changed.

At 1006, the processor 340 may replace at least one focus value associated with the at least one of the two or more focus perimeters having a changed scene with the at least one updated focus value associated with the at least one of the two or more focus perimeters having a changed scene in the group of focus values. For example, the processor 340 may replace the focus value(s) associated with the upper right focus perimeter 522 and the lower right focus perimeter 524 with updated focus values. That is, the processor 340 may update the group of focus values with the updated focus value(s) associated with the upper right focus perimeter 522 illustrated in FIG. 5B. The processor 340 may update the group of focus values with the updated focus value(s) associated with the lower right focus perimeter 524 illustrated in FIG. 5B. Further, the processor 340 may remove the focus value(s) associated with the upper right focus perimeter 522 illustrated in FIG. 5A and may remove the focus value(s) associated with the lower right focus perimeter 524 illustrated in 5A from the group of focus values.

At 1008, the processor 340 may compare the focus values in the group of updated focus values to identify an updated macro object focus value. In some embodiments, the updated macro object focus value may be the same as the previously identified macro object focus value. In some embodiments, the updated macro object focus value may be different than the previously identified macro object focus value. At 1010, in response to identifying an updated macro object focus value, the processor 340 may determine updated autofocus settings based on the updated macro object focus value. At 1012, the processor 340 may configure the camera lens based on the determined updated autofocus settings.

As illustrated in the foregoing discussion of method 1000, when the processor 340 detects a change in the scene in at least one of the focus perimeters 520, 522, 524, 526, the processor 340 may update focus values associated with the focus perimeters having a changed scene. That is, the processor 340 may update focus values in the group of focus values by targeting focus values in focus perimeters having a changed scene.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable storage medium including program instructions recorded thereon (which may, for example, cause a processor to perform one or more of the methods described herein), or a computer data signal carrying computer readable program instructions may direct an apparatus to facilitate the practice of the described methods. It is understood that such apparatus, articles of manufacture, and computer data signals also come within the scope of the present disclosure.

The term "computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile/Video Disc (DVD) or Blu-ray™ Disc, and a solid state storage device (e.g., NAND flash or synchronous dynamic RAM (SDRAM)).

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method of autofocusing a macro object by an imaging device using phase detection autofocus (PDAF), the imaging device including a lens, the method comprising:
   providing two or more focus perimeters in a viewfinder;
   obtaining a group of focus values determined based on data obtained from PDAF sensors for a current lens position, the group of focus values including at least one focus value associated with each of the two or more focus perimeters, each focus value in the group of focus values includes a magnitude and a direction for causing movement of the lens;
   comparing focus values in the group of focus values that were determined based on data obtained from PDAF sensors for the current lens position to identify a macro object focus value; and
   in response to identifying the macro object focus value, determining autofocus settings based on the macro object focus value.

2. The method of claim 1, wherein determining autofocus settings based on the macro object focus value further comprises configuring the lens based on the determined autofocus settings.

3. The method of claim 1, wherein identifying the macro object focus value comprises identifying a focus value in the group of focus values associated with an object being photographed nearest to the lens.

4. The method of claim 3, wherein comparing the focus values in the group of focus values further comprises:
ordering the focus values in the group of focus values;
determining a sub-group of focus values within a range of the macro object focus value; and
wherein determining the autofocus settings based on the macro object focus value further comprises:
determining autofocus settings based on the macro object focus value and the determined sub-group of focus values.

5. The method of claim 1, further comprising:
detecting a changed scene in the viewfinder;
obtaining a group of updated focus values, the group of updated focus values including at least one updated focus value associated with each of the two or more focus perimeters, each updated focus value in the group of updated focus values including a magnitude and a direction for causing movement of the lens;
comparing the updated focus values in the group of updated focus values to identify an updated macro object focus value; and
in response to identifying an updated macro object focus value, determining updated autofocus settings based on the updated macro object focus value.

6. The method of claim 1, further comprising:
detecting a changed scene in at least one of the two or more focus perimeters;
obtaining at least one updated focus value associated with the at least one of the two or more focus perimeters having a changed scene;
replacing at least one focus value associated with the at least one of the two or more focus perimeters having a changed scene with the at least one updated focus value associated with the at least one of the two or more focus perimeters having a changed scene in the group of focus values;
comparing the focus values in the group of focus values to identify an updated macro object focus value, the group of focus values including the at least one updated focus value; and
in response to identifying an updated macro object focus value, determining updated autofocus settings based on the updated macro object focus value.

7. The method of claim 1, wherein each of the two or more focus perimeters is associated with at least one pair of phase detection autofocus sensors.

8. The method of claim 1, wherein obtaining the group of focus values comprises, for each of the two or more focus perimeters, obtaining the at least one focus value associated with each of the two or more focus perimeters by:
representing an image portion as a pair of defocus values including a first defocus value and a second defocus value;
determining a phase difference between the first defocus value and the second defocus value; and
determining the magnitude and the direction for causing movement of the lens based on the phase difference between the first defocus value and the second defocus value.

9. The method of claim 1, wherein determining autofocus settings based on the macro object focus value comprises determining at least one of a lens focal length setting and a lens aperture setting.

10. The method of claim 1, wherein the two or more focus perimeters are arranged in a two-dimensional grid, the two-dimensional grid being located in a user-defined location.

11. An electronic device comprising:
a lens;
an image sensor including phase detection autofocus (PDAF) sensors; and
a processor coupled to the image sensor and the lens, the processor being configured to:
provide two or more focus perimeters in a viewfinder;
obtain a group of focus values determined based on data obtained from the PDAF sensors for a current lens position, the group of focus values including at least one focus value associated with each of the two or more focus perimeters, each focus value in the group of focus values includes a magnitude and a direction for causing movement of the lens;
compare focus values in the group of focus values that were determined based on data obtained from PDAF sensors for the current lens position to identify a macro object focus value; and
in response to identifying the macro object focus value, determine autofocus settings based on the macro object focus value.

12. The electronic device of claim 11, wherein determine autofocus settings based on the macro object focus value, the processor is further configured to configure the lens based on the determined autofocus settings.

13. The electronic device of claim 11, wherein identify the macro object focus value, the processor is configured to identify a focus value in the group of focus values associated with an object being photographed nearest to the lens.

14. The electronic device of claim 13, wherein compare the focus values in the group of focus values, the processor is further configured to:
order the focus values in the group of focus values;
determine a sub-group of focus values within a range of the macro object focus value; and
wherein determine autofocus settings based on the macro object focus value, the processor is further configured to:
determine autofocus settings based on the macro object focus value and the determined sub-group of focus values.

15. The electronic device of claim 11, the processor is further configured to:
detect a changed scene in the viewfinder;
obtain a group of updated focus values, the group of updated focus values including at least one updated focus value associated with each of the two or more focus perimeters, each updated focus value in the group of updated focus values including a magnitude and a direction for causing movement of the lens;
compare the updated focus values in the group of updated focus values to identify an updated macro object focus value; and
in response to identifying an updated macro object focus value, determine updated autofocus settings based on the updated macro object focus value.

16. The electronic device of claim 11, the processor is further configured to:
detect a changed scene in at least one of the two or more focus perimeters;
obtain at least one updated focus value associated with the at least one of the two or more focus perimeters having a changed scene;

replace at least one focus value associated with the at least one of the two or more focus perimeters having a changed scene with the at least one updated focus value associated with the at least one of the two or more focus perimeters having a changed scene in the group of focus values;

compare the focus values in the group of focus values to identify an updated macro object focus value, the group of focus values including the at least one updated focus value; and in response to identifying an updated macro object focus value, determine updated autofocus settings based on the updated macro object focus value.

17. The electronic device of claim 11, wherein each of the two or more focus perimeters is associated with at least one pair of phase detection autofocus sensors.

18. The electronic device of claim 11, wherein obtain the group of focus values, the processor is configured to, for each of the two or more focus perimeters, obtain the at least one focus value associated with each of the two or more focus perimeters by the processor configured to:

represent an image portion as a pair of defocus values including a first defocus value and a second defocus value;

determine a phase difference between the first defocus value and the second defocus value; and determine the magnitude and direction for causing movement of the lens based on the phase difference between the first defocus value and the second defocus value.

19. The electronic device of claim 11, wherein determine autofocus settings based on the macro object focus value, the processor is configured to determine at least one of a lens focal length setting and a lens aperture setting.

20. A non-transitory computer-readable storage medium comprising processor-executable instructions which, when executed by a processor of an electronic device, cause the electronic device to:

provide two or more focus perimeters in a viewfinder;

obtain a group of focus values determined based on data obtained from phase detection autofocus (PDAF) sensors for a current lens position, the group of focus values including at least one focus value associated with each of the two or more focus perimeters, each focus value in the group of focus values includes a magnitude and a direction for causing movement of the lens;

compare focus values in the group of focus values that were determined based on data obtained from PDAF sensors for the current lens position to identify a macro object focus value; and in response to identifying the macro object focus value, determining autofocus settings based on the macro object focus value.

* * * * *